United States Patent [19]

Dean

[11] Patent Number: 4,491,647

[45] Date of Patent: Jan. 1, 1985

[54] POLYMER COMPOSITION CONTAINING POLYCARBONATE AND A COPOLYMER OF METHYLMETHACRYLATE WITH N-PHENYLMALEIMIDE

[75] Inventor: Barry D. Dean, Broomall, Pa.

[73] Assignee: Atlantic Richfield Company, Los Angeles, Calif.

[21] Appl. No.: 557,975

[22] Filed: Dec. 5, 1983

[51] Int. Cl.³ .................. C08L 69/00; C08L 51/00
[52] U.S. Cl. ...................... 525/67; 525/86; 525/148
[58] Field of Search ............... 525/148, 67, 468, 86

[56] References Cited

U.S. PATENT DOCUMENTS 3,489,822  1/1970  Witt et al. ................... 525/301
4,204,047  5/1980  Margotte et al. .............. 525/148
4,410,662 10/1983  Witman et al. ................ 525/148

*Primary Examiner*—Theodore E. Pertilla
*Attorney, Agent, or Firm*—Dennis M. Kozak

[57] ABSTRACT

A polyblend comprising a thermoplastic polycarbonate and at least one copolymer selected from methylmethacrylate/N-phenylmaleimide and EPDM-g-methylmethacrylate/N-phenylmaleimide is disclosed. In one embodiment, the polyblend will comprise an acrylonitrile-butadiene-styrene resin and/or a rubber modified styrene maleic anhydride copolymer.

10 Claims, No Drawings

POLYMER COMPOSITION CONTAINING POLYCARBONATE AND A COPOLYMER OF METHYLMETHACRYLATE WITH N-PHENYLMALEIMIDE

This invention relates to polymer compositions.

More specifically, this invention relates to a polyblend comprising a thermoplastic polycarbonate and a copolymer of methylmethacrylate and N-phenylmaleimide.

In one of its more specific aspects, this invention pertains to a polyblend comprising a thermoplastic polycarbonate, a copolymer of methylmethacrylate and N-phenylmaleimide and an impact modified copolymer of methylmethacrylate and N-phenylmaleimide.

The incompatibility of polymers with one another is well established. Coming up with a workable combination of polymers is still as much luck and art as it is science. In the past, the terms "polymer alloy" and "polymer blend" or "polyblend" were used interchangeably. Technically, however, the term "polymer alloy" means a combination of polymers which are fully compatible with one another. And, as used herein, the term "polyblend" means a combination of polymers which are partially compatible, that is, the polymers exhibit partial miscibility with each other as evidenced by equivalent shifts in the glass transition temperatures of the pure polymer components, the shifts occurring such that the glass transition temperature values approach coalescence.

This invention provides novel polyblends of a polycarbonate and at least one copolymer selected from the group consisting of a methylmethacrylate/N-phenylmaleimide copolymer and an ethylene-propylene diene monomer ("EPDM")-g-methylmethacrylate/N-phenylmaleimide copolymer. The polyblends exhibit excellent physical properties.

According to this invention, there is provided a polyblend which comprises, in weight percent, from about 80 to about 20 of a thermoplastic polycarbonate based on bis-(hydroxyaryl) alkanes, and from about 20 to about 80 of a methylmethacrylate/N-phenylmaleimide copolymer containing from about 75 to about 90 recurring units of methylmethacrylate monomer and from about 25 to about 10 recurring units of N-phenylmaleimide monomer.

Also according to this invention, there is provided a polyblend which comprises, in weight percent, from about 80 to about 20 of a thermoplastic polycarbonate based on bis-(hydroxyaryl)alkanes, and from about 20 to about 80 of an EPDM-g-methylmethacrylate/N-phenylmaleimide copolymer which contains from about 60 to about 40 recurring units of an EPDM having chemically grafted thereto from about 40 to about 60 of a methylmethacrylate/N-phenylmaleimide copolymer containing from about 75 to about 90 recurring units of methylmethacrylate monomer and from about 25 to about 10 recurring units of N-phenylmaleimide monomer.

Moreover, it has been found that a polyblend which contains polycarbonate and a mixture of methylmethacrylate/N-phenylmaleimide copolymer and EPDM-g-methylmethacrylate/N-phenylmaleimide copolymer exhibits improved strength properties as compared to the use of either copolymer alone.

Accordingly, in a preferred embodiment, the polyblend of this invention will comprise, in weight percent, from about 80 to about 20 of a thermoplastic polycarbonate based on bis-(hydroxyaryl)alkanes, and from about 20 to about 80 of a mixture of a first and a second copolymer, wherein said mixture contains: (1) from about 20 to about 99 of an EPDM-g-methylmethacrylate/N-phenylmaleimide first copolymer which contains from about 60 to about 40 recurring units of an EPDM having chemically grafted thereto from about 40 to about 60 of a methylmethacrylate/N-phenylmaleimide copolymer containing from about 75 to about 90 recurring units of methylmethacrylate monomer and from about 25 to about 10 recurring units of N-phenylmaleimide monomer, and (2) from about 1 to about 80 of a methylmethacrylate/N-phenylmaleimide second copolymer containing from about 75 to about 90 recurring units of methylmethacrylate monomer and from about 25 to about 10 recurring units of N-phenylmaleimide monomer, wherein said second copolymer has the same weight percent composition as said methylmethacrylate/N-phenylmaleimide copolymer employed in said first copolymer and chemically grafted to EPDM.

It has also been found that the methylmethacrylate/N-phenylmaleimide and the EPDM-g-methylmethacrylate/N-phenylmaleimide copolymers have utility as interfacial modifiers, that is, as ternary compatibilizing agents for blends of polycarbonates with acrylonitrile-butadiene-styrene (ABS) resins or with rubber-modified styrene-maleic anhydride resins.

Polycarbonates suitable to produce the polyblends of this invention are homopolycarbonates based on bisphenols having the following general formula:

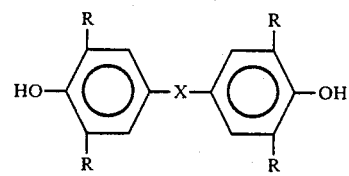

wherein each R separately represents hydrogen, a $C_1$ to $C_4$ alkyl group, chlorine, bromine and wherein X represents a direct bond $C_1$ to $C_8$ alkylene.

Polycarbonates having the above general formula include: 2,2-bis-(4-hydroxyphenyl)-propane; 2,2-bis-(3-chloro-4-hydroxyphenyl)-propane; 2,2-bis-(3,5-dimethyl-4-hydroxyphenyl)propane; 2,4-bis-(3,5-dimethyl-4-hydroxylphenyl)-2-methylbutane. Particularly suitable for use in the practice of this invention is 2,2-bis-(4-hydroxyphenyl)-propane.

The methylmethacrylate/N-phenylmaleimide copolymers suitable for use in this invention are random copolymers having peak molecular weights within the range of from about 100,000 to about 500,000, preferably 250,000 to 350,000. The copolymers can be prepared by a free radical polymerization in solution, in bulk or by suspension. The copolymers will comprise from about 10 to about 25 weight percent N-phenylmaleimide and 90 to 75 weight percent methylmethacrylate. Preferably, the copolymers will be prepared by suspension polymerization.

Methods are known for chemically grafting the methylmethacrylate/N-phenylmaleimide copolymer to an EPDM rubber to produce an EPDM-g-methylmethacrylate/N-phenylmaleimide copolymer usable to produce polyblends of this invention. For example, the method taught in Example 1 of U.S. Pat. No. 3,489,822 is suitable for use and is incorporated herein by reference thereto.

Any suitable EPDM can be employed. Preferably, the diene will be selected from hexadiene, dicylopentadiene or ethylidene norbornene.

In order to maintain molecular weight, it is necessary to stabilize the methylmethacrylate/N-phenylmaleimide copolymers prior to any type of thermal processing, using any of the commercially available antioxidants. The preferred antioxidant is an equal weight percent mixture of N,N-diphenyl-p-phenylene diamine and tris(mono and dinoyl)phenyl phosphite. The total amount of antioxidant employed should be within the range of from about 1 to about 2 weight percent add-on to the total weight percent of the polyblend.

The polyblends of this invention may be prepared using any suitable method of blending. Preferably, the polyblends are prepared by melt mixing at a temperature above the softening points of the polyblends using any conventional high shear melt mixing apparatus, including twin screw extruders, single screw extruders, and the like. The polyblend extrudate can be chopped into pellets and molded using any conventional method of molding including: injection molding, roto-molding and the like. The word "molding" is meant to encompass all sheet and profile extrusion.

Having described the materials and methods of this invention, reference is now made to the following examples which serve to demonstrate the invention.

EXAMPLE 1

This example demonstrates the preparation of a methylmethacrylate/N-phenylmaleimide copolymer suitable for use in this invention.

A citrate bottle was charged with 53.5 g of methylmethacrylate, 16.5 g of N-phenylmaleimide, 140 g of distilled water, 10 ml of a 9.1 weight % tricalcium phosphate in water solution as the suspending agent, 0.003 g of sodium bisulfite, 0.14 g of t-butyl peroctoate and 0.06 g of t-butyl perbenzoate.

The citrate bottle was placed in a bottle polymerizer at 95° C. for 3 hours then 135° C. for 2 hours.

The resulting methylmethacrylate/N-phenylmaleimide copolymer beads were isolated, washed with methanol and dried prior to use in compounding.

The copolymer was analyzed for composition and found to contain 76.5 weight percent methylmethacrylate and 23.5 weight percent N-phenylmaleimide.

The copolymer was tested and found to have a $T_g$ of 143° C. as measured by differential scanning calorimetry (DSC).

EXAMPLE 2

This example demonstrates the preparation of a second methylmethacrylate/N-phenylmaleimide copolymer suitable for use in this invention.

A citrate bottle was charged with 59.5 g of methylmethacrylate, 10.5 g of N-phenylmaleimide, 140 g of distilled water, 10 ml of a 9.1 weight % tricalcium phosphate in water solution as the suspending agent, 0.003 g of sodium bisulfite, 0.14 g of t-butyl peroctoate and 0.06 g of t-butyl perbenzoate.

The citrate bottle was placed in a bottle polymerizer at 95° C. for 3 hours then 135° C. for 2 hours. The resulting methylmethacrylate/N-phenylmaleimide copolymer beads were isolated, washed with methanol and dried prior to use in compounding.

The copolymer was analyzed for composition and found to contain 85 weight percent methylmethacrylate and 15 weight percent N-phenylmaleimide.

The copolymer was tested and found to have a $T_g$ of 130.5° C. as measured by DSC.

EXAMPLE 3

This example demonstrates the preparation of a polyblend of this invention from polycarbonate and the methylmethacrylate/N-phenylmaleimide copolymer of Example 2.

About 600 g of a polycarbonate (2,2-bis(4-hydroxyphenyl)propane) designated Merlon ® M-50 commercially available from Mobay Chemical Corporation were melt compounded at 525° F. with 400 grams of methylmethacrylate/N-phenylmaleimide copolymer produced in Example 2. Test specimens were injection molded for physical property comparison of the resulting polyblend with those of the individual polymer components. Table I below sets forth the physical property values obtained.

EXAMPLE 4

This example demonstrates the preparation of an impact modified EPDM-g-methylmethacrylate/N-phenylmaleimide compolymer for use in the polyblends of this invention.

About 26 g of Royalene ® HT 580 Resin an ethylene-propylene-dicyclopentadiene terpolymer commercially available from Uniroyal Chemical, Division of Uniroyal Inc. were dissolved in about 1400 g of a 75:25 mixture of t-butylbenzene:chlorobenzene at 70° C.

With stirring, 10 g of t-butylhydroperoxide and 2.5 g of a 50:50 mixture of cuprous chloride:cuprous acetate in 200 ml of absolute ethanol were added.

The reaction was continued with stirring, at 70° C. for 48 hours.

The peroxidized EPDM was recovered by precipitation in acetone. A second dissolution in toluene followed by precipitation in methanol was required to insure removal of the copper catalyst.

About 200 g of the peroxidized EPDM rubber was swollen with a benzene solution of methyl methacrylate and N-phenylmaleimide. (Benzene:MMA:NPMI; 200:134.4:41.2).

The swollen EPDM rubber was heated to 140° C. and maintained at 140° C. for about 10 hours. The solid rubber concentrate that resulted was pulverized and dried under vacuum for 24 hours at 110° C. The rubber concentrate was analyzed and found to have the following overall composition:

| | |
|---|---|
| EPDM-g-MMA/NPMI | 53 EPDM:47 MMA/NPMI |
| Grafted MMA/NPMI | 24 wt % NPMI content |
| Level of grafted MMA/NPMI* | 52% |
| Glass transition temperature of MMA/NPMI matrix (by DSC) | 143° C. |

*extracted in methylethylketone

About 400 g of the methylmethacrylate/N-phenylmaleimide copolymer prepared according to Example 1 were melt compounded at 525° F. with about 200 g of the EPDM-g-methylmethacrylate N-phenylmaleimide resin described above. Test specimens were injection molded and tested for physical properties. Table I below sets forth the physical property values obtained.

EXAMPLE 5

This example demonstrates the preparation of a polyblend of this invention.

About 400 g of polycarbonate (Merlon ® M-50, Mobay) were melt compounded at 530° F. with about 600 g of the EPDM-g-methylmethacrylate/N-phenylmaleimide and methylmethacrylate/N-phenylmaleimide copolymer mixture prepared in Example 4.

Injection molded samples were prepared and their physical properties determined. The property values obtained are set forth in Table I below.

EXAMPLE 6

This example demonstrates the preparation of a polyblend of this invention.

About 600 g of polycarbonate (Merlon ® M-50, Mobay) were melt compounded at 540° F. with about 400 g of the EPDM-g-methylmethacrylate/N-phenylmaleimide and methylmethacrylate/N-phenylmaleimide copolymer mixture prepared in Example 4.

Injection molded samples were prepared and their physical properties determined. The property values obtained are set forth in following Table I.

with a rubber modified styrene/maleic anhydride copolymer.

Four polyblends (A–D) were prepared by melt compounding at 500° F. The compositions of the four blends are as follows.

| | Polyblend | | | |
|---|---|---|---|---|
| | A | B | C | D |
| Component | Amount (wt percent) | | | |
| polycarbonate[1] | 45 | 45 | 45 | 45 |
| ABS[2] | 0 | 0 | 55 | 50 |
| rubber-modified SMA[3] | 55 | 50 | 0 | 0 |
| MMA/NPMI[4] | 0 | 5 | 0 | 5 |
| Total | 100 | 100 | 100 | 100 |

[1]Merlon ® M-50 (Mobay Corp.)
[2]Lustran ® 2000 (Monsanto Co.)
[3]Dylark ® 350 (ARCO Chemical Co.)
[4]Example 2

Following Table II shows the improvement in physical properties obtained by the incorporation of a small amount of methylmethacrylate/N-phenylmaleimide into polyblends of polycarbonate with either rubber modified styrene/maleic anhydride or ABS.

TABLE I

| Property | ASTM | Polycarbonate (Merlon ® M-50) | MMA/NPMI (Example 2) | Polyblend of (Example 3) | MMA/NPMI-EPDM-g-MMA/NPMI mixture (Example 4) | Polyblend of (Example 5) | Polyblend of (Example 6) |
|---|---|---|---|---|---|---|---|
| $T_g$(°C., DSC) | * | 157 | 130.5 | 150;138 | 143 | 151(broad) | 152(broad) |
| Tensile strength (psi) | D-638 | 10,100 | 8,000 | 10,500 | 8,350 | 10,470 | 11,900 |
| Flexural strength (psi) | D-790 | 12,700 | 10,200 | 14,700 | 11,400 | 15,000 | 15,200 |
| Flexural modulus (psi) | D-790 | 320,000 | 340,000 | 370,000 | 325,000 | 370,000 | 375,000 |
| DTUL (⅛″,°F.) (unannealed) | D-648 | 260 | 218 | 250 | 247 | 250 | 260 |
| Notched Izod (ft-lbs/in) | D-256 | 15 | 0.6 | 1.6 | 4.2 | 12.1 | 20.2 |
| Gardner Falling Weight Index (in-lbs) | ** | 480+ | 0 | 192 | 208 | 320 | 480+ |

*Glass transition temperature data was obtained by differential scanning calorimetry (DSC) and applied to the Flory-Fox relationship.
**½″ diameter 8-pound weight and 1¼″ diameter orifice.

The methylmethacrylate/N-phenylmaleimide or EPDM-g-methylmethacrylate/N-phenylmaleimide copolymers are also suitable for use as interfacial modifiers (ternary compatibilizing agents) for polyblends of polycarbonate with ABS resins, rubber modified styrene/maleic anhydride copolymers or mixtures thereof.

If the copolymer is employed as a ternary compatibilizing agent, it will be employed in an amount within the range of from about 5 to about 10 add-on weight percent per 100 weight percent of the polyblend. And, the polyblend into which the ternary compatibilizing agent is incorporated will, preferably contain in weight percent from about 40 to about 60 of the polycarbonate described above and a total of from about 60 to about 40 of at least one polymer selected from the group consisting of ABS and rubber modified styrene/maleic anhydride.

EXAMPLE 7

This example will serve to demonstrate the utility of methylmethacrylate/N-phenylmaleimide copolymers as ternary compatibilizing agents for polyblends of polycarbonates with an ABS resin and polycarbonate

TABLE II

| | | Polyblend | | | |
|---|---|---|---|---|---|
| Property | ASTM | A | B | C | D |
| Tensile strength (psi) | D-638 | 7300 | 7700 | 7150 | 7250 |
| DTUL (⅛″, °F.) (unannealed) | D-648 | 214 | 215 | 190 | 194 |
| Notched Izod (ft-lb/in) | D-256 | 8.5 | 10.2 | 5.0 | 6.7 |
| Gardner Falling Weight Index (in-lbs) | * | 104 | 160 | 160 | 200 |

*½″ diameter 8-pound weight and 1¼″ diameter orifice.

It will be evident from the foregoing that various modifications can be made to this invention. Such, however, are considered to be within the scope of this invention.

What is claimed is:

1. A polyblend which comprises in weight percent, from about 80 to about 20 of a thermoplastic polycarbonate based on bis-(hydroxyaryl)alkanes, and from about 20 to about 80 of a methylmethacrylate/N-phenylmaleimide copolymer containing from about 75 to about 90 recurring units of methylmethacrylate monomer and from about 25 to about 10 recurring units of N-phenylmaleimide monomer.

2. The polyblend of claim 1 in which said polycarbonate has the following general formula:

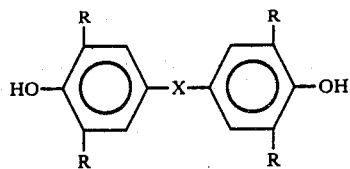

wherein each R separately represents hydrogen, a $C_1$ to $C_4$ alkyl group, chlorine, bromine and wherein X represents a direct bond $C_1$ to $C_8$ alkylene group.

3. The polyblend of claim 1 in which said methylmethacrylate/N-phenylmaleimide copolymer is a random copolymer having a peak molecular weight within the range of from about 100,000 to about 500,000.

4. A polyblend which comprises, in weight percent, from about 80 to about 20 of a thermoplastic polycarbonate based on bis-(hydroxyaryl)alkanes, and from about 20 to about 80 of an EPDM-g-methylmethacrylate/N-phenylmaleimide copolymer which contains from about 60 to about 40 recurring units of an EPDM having chemically grafted thereto from about 40 to about 60 of a methylmethacrylate/N-phenylmaleimide copolymer containing from about 75 to about 90 recurring units of methylmethacrylate monomer and from about 25 to about 10 recurring units of N-phenylmaleimide monomer.

5. The polyblend of claim 4 in which said polycarbonate has the following general formula:

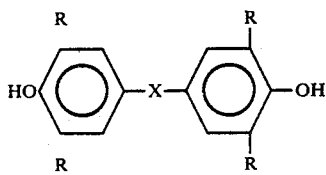

wherein each R separately represents hydrogen, a $C_1$ to $C_4$ alkyl group, chlorine, bromine and wherein X represents a direct bond $C_1$ to $C_8$ alkylene group.

6. The polyblend of claim 4 in which said methylmethacrylate/N-phenylmaleimide copolymer is a random copolymer having a peak molecular weight within the range of from about 100,000 to about 500,000.

7. A polyblend which comprises in weight percent, from about 80 to about 20 of a thermoplastic polycarbonate based on bis-(hydroxyaryl)alkanes, and from about 20 to about 80 of a mixture of a first and a second copolymer, wherein said mixture contains: (1) from about 20 to about 99 of an EPDM-g-methylmethacrylate/N-phenylmaleimide first copolymer which contains from about 60 to about 40 recurring units of an EPDM having chemically grafted thereto from about 40 to about 60 of a methylmethacrylate/N-phenylmaleimide copolymer containing from about 75 to about 90 recurring units of methylmethacrylate monomer and from about 25 to about 10 recurring units of N-phenylmaleimide monomer, and (2) from about 1 to about 80 of a methylmethacrylate/N-phenylmaleimide second copolymer containing from about 75 to about 90 recurring units of methylmethacrylate monomer and from about 25 to about 10 recurring units of N-phenylmaleimide monomer, wherein said second copolymer has the same weight percent composition as said methylmethacrylate/N-phenylmaleimide copolymer employed in said first copolymer and chemically grafted to EPDM.

8. The polyblend of claim 7 in which said polycarbonate has the following general formula:

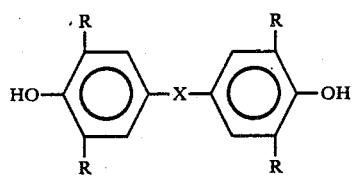

wherein each R separately represents hydrogen, a $C_1$ to $C_4$ alkyl group, chlorine, bromine and wherein X represents a direct bond $C_1$ to $C_8$ alkylene group.

9. The polyblend of claim 7 in which said methylmethacrylate/N-phenylmaleimide copolymer employed in said first and said second copolymers is a random copolymer having a peak molecular weight within the range of from about 100,000 to about 500,000.

10. A polyblend comprising:
(a) from about 40 to about 60 weight percent of a thermoplastic polycarbonate based on bis-(hydroxyaryl)alkanes;
(b) from about 60 to about 40 total weight percent of at least one polymer selected from the group consisting of acrylonitrile-butadiene-styrene and rubber-modified styrene-maleic anhydride; and,
(c) as a ternary compatibilizing agent for (a) and (b), from about 5 to about 10 total add-on weight percent per 100 weight percent (a) and (b) of at least one agent selected from the group consisting of a methylmethacrylate/N-phenylmaleimide copolymer and an EPDM-g-methylmethacrylate/N-phenylmaleimide copolymer.

* * * * *